United States Patent
Souria

(10) Patent No.: US 12,411,232 B2
(45) Date of Patent: Sep. 9, 2025

(54) METHOD FOR RADAR DETECTION OF TARGETS

(71) Applicant: RENAULT S.A.S, Boulogne-Billancourt (FR)

(72) Inventor: Charaf-Eddine Souria, Guyancourt (FR)

( * ) Notice: Subject to any disclaimer, the term of this patent is extended or adjusted under 35 U.S.C. 154(b) by 342 days.

(21) Appl. No.: 17/905,005

(22) PCT Filed: Feb. 4, 2021

(86) PCT No.: PCT/EP2021/052583
§ 371 (c)(1),
(2) Date: Aug. 25, 2022

(87) PCT Pub. No.: WO2021/175532
PCT Pub. Date: Sep. 10, 2021

(65) Prior Publication Data
US 2023/0108806 A1    Apr. 6, 2023

(30) Foreign Application Priority Data

Mar. 4, 2020  (FR) ...................... 2002194

(51) Int. Cl.
*G01S 13/931* (2020.01)

(52) U.S. Cl.
CPC ..... *G01S 13/931* (2013.01); *G01S 2013/9322* (2020.01)

(58) Field of Classification Search
CPC ................ G01S 13/931; G01S 2013/9322
USPC ......................................... 342/80
See application file for complete search history.

(56) References Cited

U.S. PATENT DOCUMENTS

| | | | |
|---|---|---|---|
| 6,771,609 B1 * | 8/2004 | Gudat | H04B 17/3912 370/332 |
| 9,564,052 B2 * | 2/2017 | Gruteser | G08G 1/01 |
| 10,422,872 B2 * | 9/2019 | Dunik | G01S 13/86 |
| 10,936,903 B2 * | 3/2021 | Gonzalez | G06V 10/7788 |
| 11,392,120 B2 * | 7/2022 | Censi | G05D 1/0088 |
| 11,493,596 B2 * | 11/2022 | Schoor | G01S 13/584 |
| 11,879,992 B2 * | 1/2024 | Lang | G01S 7/415 |
| 11,897,460 B2 * | 2/2024 | Chang | B60W 50/0097 |
| 2014/0097979 A1 * | 4/2014 | Nohara | G01S 13/87 342/90 |

(Continued)

OTHER PUBLICATIONS

International Search Report issued on Mar. 30, 2021 in PCT/EP2021/052583 filed on Feb. 4, 2021, 2 pages.

(Continued)

*Primary Examiner* — Nuzhat Pervin
(74) *Attorney, Agent, or Firm* — Oblon, McClelland, Maier & Neustadt, L.L.P.

(57) ABSTRACT

A method for radar detection of targets includes: determining digital data representative of the radar environment in real time, calculating a probability of existence of mock targets in a plurality of regions of the radar environment on the basis of the digital data representative of the radar environment, receiving digital data corresponding to at least one radar target, transmitted by the radar, including digital location data of the at least one radar target, calculating a reliable confidence index associated with the at least one radar target according to the probability of existence of mock targets in the region where the at least one radar target is located.

13 Claims, 2 Drawing Sheets

(56) References Cited

U.S. PATENT DOCUMENTS

Figure 1:
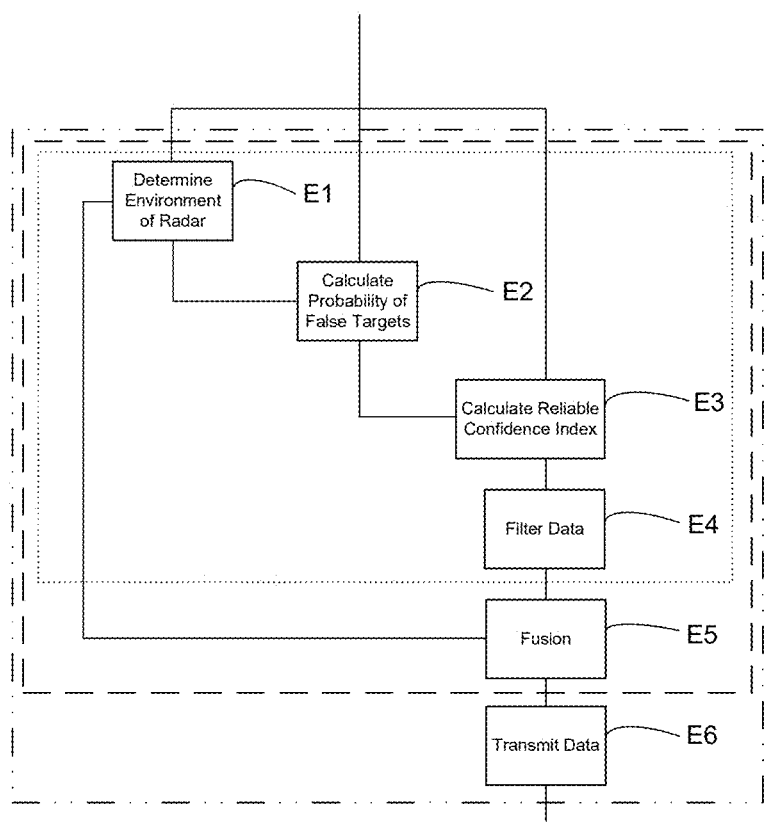

| | | | | |
|---|---|---|---|---|
| 2015/0204972 A1* | 7/2015 | Kuehnle | ................. | G01S 13/42 |
| | | | | 342/156 |
| 2015/0323649 A1* | 11/2015 | Lee | ....................... | G01S 13/584 |
| | | | | 342/27 |
| 2018/0120842 A1* | 5/2018 | Smith | ..................... | G01S 7/412 |
| 2018/0341012 A1* | 11/2018 | Takada | .................... | G01S 7/414 |
| 2020/0150260 A1* | 5/2020 | Lang | ...................... | G01S 13/42 |
| 2020/0174096 A1* | 6/2020 | Cho | ...................... | G01S 13/343 |
| 2020/0371198 A1* | 11/2020 | Schoor | .................... | G01S 7/354 |
| 2020/0371199 A1* | 11/2020 | Schoor | .................. | G01S 13/584 |
| 2021/0116539 A1* | 4/2021 | Sick | ......................... | G01S 7/352 |
| 2021/0131823 A1* | 5/2021 | Giorgio | ............... | G06V 10/803 |
| 2021/0132212 A1* | 5/2021 | Brosche | ............... | G01S 13/589 |
| 2021/0173043 A1* | 6/2021 | Lang | ...................... | G01S 13/723 |
| 2022/0245109 A1* | 8/2022 | Hatami-Hanza | ......... | G06N 7/01 |

OTHER PUBLICATIONS

French Preliminary Search Report issued Jan. 18, 2021 in French Application 20 02194, filed on Mar. 4, 2020, 3 pages (with English Translation of Categories of Cited documents).

* cited by examiner

METHOD FOR RADAR DETECTION OF TARGETS

The invention relates to a method for detecting targets using a radar. It also relates to a method for guiding or alerting a motor vehicle which implements such a method for detecting targets using a radar. The invention also relates to a device for detecting targets using a radar. The invention also relates to a motor vehicle comprising such a device for detecting targets using a radar.

To assist in the driving of a motor vehicle or even guiding a motor vehicle autonomously, various types of perception sensors are used. Among them, radar exhibits important qualities, including robustness with respect to weather conditions, a detection range greater than 200 meters, and the ability to detect hidden targets. A radar thus makes it possible to effectively assist in the driving of a motor vehicle by detecting targets liable to interfere with the path of the motor vehicle. However, the existing radar target detection solutions are not sufficiently reliable. Specifically, a radar often detects nonexistent targets, referred to as "ghost targets" or "false targets", due to numerous stray reflections of the radar waves. The main challenge for the radar is to differentiate ghost targets from real targets.

The aim of the invention is to provide a device and a method for detecting targets using a radar whose degree of reliability is improved, and in particular allows guidance of an autonomous vehicle or a vehicle alert.

To that end, the invention relates to a first method, which is for detecting targets using a radar. The first method comprises the following steps:
- determining digital data representative of the environment of the radar in real time,
- calculating a probability of the presence of false targets in multiple regions of this environment of the radar based on said digital data representative of the environment of the radar,
- receiving digital data transmitted by the radar corresponding to at least one radar target comprising digital data on the location of the at least one radar target,
- calculating a reliable confidence index associated with the at least one radar target based on the probability of the presence of false targets in the region where the at least one radar target is located.

The step of determining digital data representative of the environment of the radar may use digital data from a high-definition map and, optionally, data from said radar and, optionally, from one or more other sensors.

The step of calculating a probability of the presence of false targets may be based on equations for the propagation of the electromagnetic waves in the environment of the radar, which are dependent on said digital data representative of the environment of the radar.

The digital data corresponding to at least one radar target transmitted by the radar may comprise an initial confidence index and the calculation of a reliable confidence index associated with the at least one radar target may comprise the following sub-steps:
- if the probability of the presence of false targets in the region where the at least one radar target is located is lower than a given threshold, the reliable confidence index is equal to the initial confidence index,
- if the probability of the presence of false targets in the region where the at least one radar target is located is higher than or equal to said given threshold, the new reliable confidence index is strictly lower than the initial confidence index.

The invention also relates to a second method, which is for detecting targets using a radar and at least one other sensor. This second method may comprise a first phase consisting in implementing a method for detecting targets using a radar according to the first method as defined above, and may also comprise a fusion step which aggregates the digital data from said method for detecting targets using a radar and the additional digital data transmitted by at least one other sensor so as to output digital data corresponding to at least one target, said digital data comprising a location of the at least one target and a fusion confidence index for the at least one target.

The second method, for detecting targets using a radar and at least one other sensor, may further comprise the following step: if a target from the fusion step has a fusion confidence index higher than a predetermined threshold, then the digital data associated with the at least one target are transmitted for them to be taken into account in the step of determining digital data representative of the environment of the radar.

The invention also relates to a third method, which is for guiding or alerting a vehicle. This third method may comprise the implementation of the method for detecting targets using a radar according to the first method as defined above, or the implementation of the method for detecting targets using a radar and at least one other sensor according to the second method as defined above, and a step transmitting the digital data of representative of each identified target to a computer of a vehicle for them to be taken into account in the guiding or alerting of the vehicle.

According to the invention, a first system allows the detection of targets using a radar. The first system comprises at least one radar connected by a communication device to a computer comprising hardware and/or software elements implementing the first method as defined above, in particular hardware and/or software elements designed to implement the first method as defined above.

According to the invention, a second, more comprehensive system allows the detection of targets using a radar and at least one sensor. The second system comprises a system for detecting targets using a radar as defined according to the first system, at least one other sensor and another computer, said other computer comprising hardware and/or software elements implementing the second method as defined above, in particular hardware and/or software elements designed to implement the second method as defined above.

The invention also relates to a motor vehicle comprising a driver assistance system and a more comprehensive system for detecting targets using a radar and at least one sensor as defined according to the second system, and a computer implementing a method for guiding or alerting a vehicle according to the third method as defined above.

Figure 2:
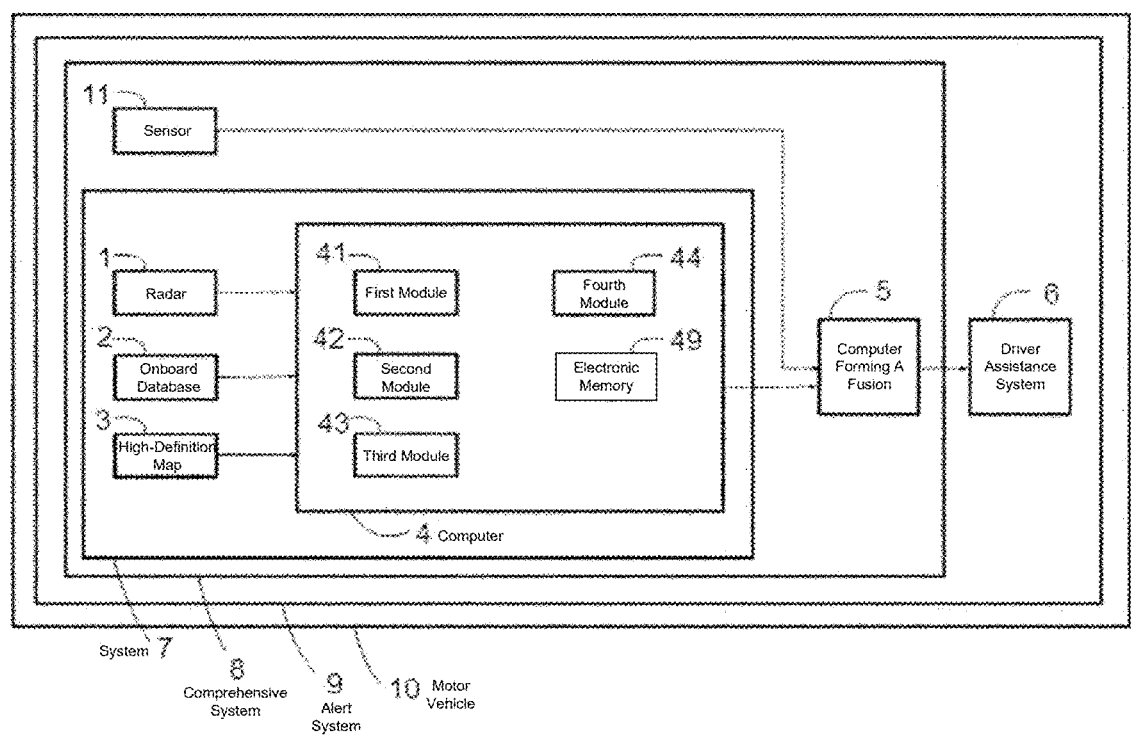

These objects, features and advantages of the present invention will be disclosed in detail in the following description of one particular embodiment given by way of non-limiting example and with reference to the appended figures, in which:

FIG. 1 schematically shows a flow diagram of a method for detecting targets using a radar according to one embodiment of the invention;

FIG. 2 schematically shows a system for detecting targets using a radar according to one embodiment of the invention.

One embodiment of the method for detecting targets using a radar is described below with reference to FIG. 1.

Throughout the remainder description, the expression "radar target" will be used to refer to a target detected using a radar, the term "false target" will be used to refer to a radar target detected erroneously, and the term "real target" will be used to refer to a radar target that is not false. The object of the invention is to determine at least which radar targets have a high probability of being false targets.

The method is based on the real-time calculation of a confidence index associated with each radar target as a function of the region where this radar target is located, more particularly as a function of the level of reflection of the electromagnetic waves caused by the specific environment of the radar.

The method implements a first step E1 of determining digital data representative of the environment of a radar 1 in real time. For this, the method for detecting targets using a radar uses digital data from a high-definition map 3 and, optionally, data from said radar and, optionally, from one or more other sensors. The digital data from a high-definition map 3 may be on board and stored locally in an electronic memory, or be transmitted from a remote server by any communication means.

The high-definition map 3 describes the road environment, and may comprise information such as road width, tunnel height, barrier type, position of a bridge, etc.

In addition, additional digital data from the radar itself and/or from any other sensor makes it possible to obtain complete information of the environment of the radar. Such additional digital data may originate from fusion step E5, which will be described later on. These additional digital data comprise in particular elements which may be absent from the high-definition map 3 such as, for example, a truck parked at the roadside.

In this step, the geometric shapes of the elements making up the road environment may be simplified in order to keep only those geometric properties which affect the model used in the next step, step E2.

In a second step E2, the method implements the calculation of a probability of the presence of false targets in multiple regions of this environment of the radar, that is to say based on said digital data representative of the environment of the radar determined in the first step.

The calculation of the probability of the presence of a false target is carried out by modeling the physical laws that cause the reflections of the radar waves off the environment. According to the embodiment, this calculation is based on the model of electromagnetic radiation patterns. This calculation uses more data provided by an onboard database 2 comprising digital data corresponding to electromagnetic properties of objects This calculation may also use the of the road. T configuration parameters of the radar 1, such as the transmission and reception radiofrequency parameters, as well as the configuration of the radar antennas.

On completion of this second step of the method, the environment of the radar 1 is thus mapped in real time with the association of a level of probability of the presence of false targets at various regions in this environment of the radar.

In a third step E3, the method calculates a reliable confidence index associated with at least one radar each radar target, target, and preferably with transmitted by the radar, as a function of the probability of the presence of false targets in the region of the environment of the radar where the at least one radar target is located.

In this third step, the processing relates to all or some of the radar targets from the radar 1. The latter transmits, as output, digital data representative of detected radar targets. These digital data comprise, in particular, at least information on the position of each radar target and an initial confidence index associated with each radar target. This initial confidence index for the radar target has been established by the radar 1 itself and is in practice not precise enough for sufficiently reliable identification of false targets.

According to the method of the invention, there corresponds to the position of each radar target a probability of the presence of a false target, calculated in the second step. This probability is used in the calculation of a new, more reliable confidence index for the radar target, referred to as the reliable confidence index.

An exemplary calculation implemented according to this embodiment is:
  if the probability of the presence of false radar targets in the region where the radar target is located is lower than a given threshold (for example 0.5), then the reliable confidence index for the radar target is equal to the initial confidence index, that is to say the confidence index remains unchanged,
  otherwise, the reliable confidence index will be set to a value strictly lower than the initial confidence index. For example, reliable confidence index could be calculated according to the formula:

$$\text{reliable\_confidence\_index} = 2 \times \text{initial\_confidence\_index} \times (1 - \text{probability\_track\_false})$$

In a fourth, filtering step E4, the digital data representative of detected radar targets coming directly from the radar 1 are compared with the data from step E3. When there is a correspondence between a radar target coming directly from the radar 1 and a radar target processed by the method of the invention (in particular substantially the same location), the radar target directly from the radar replaced with the is corresponding target from step E3, the reliability of the associated digital data for which has been determined.

This fourth, filtering step E4 comprises storing radar targets from the third step E3 in a memory in order to be able to associate them with a target directly from the radar.

One embodiment of the method for detecting targets using a radar and at least one other sensor is further described below with reference to FIG. 1. Specifically, it is advantageous to be able to enrich the information from a single radar with additional information on the same environment, detected by one or more other sensors, which may be of a different nature, for example a camera.

The method for detecting targets using a radar and at least one other sensor integrates steps E1 to E4 described above for the reliable detection of radar targets by the radar 1, as well as an additional, fusion step E5.

The object of fusion step E5 is to use the information collected by the various sensors to increase the accuracy of the data relating to each target, in particular the reliability of the confidence index for each target.

Fusion step E5 processes the targets from the fourth, filtering step E4 described above, and the data from one or more other sensors, which may be, for example, radar and/or camera sensors.

For each radar target, fusion step E5 recalculates a confidence index, referred to as the fusion confidence index, which takes into account information from filtering step E4, in particular the reliable confidence index associated with a radar target, and digital data relating to this same target from one or more other sensors.

Step E5 transmits the radar targets thus recalculated, i.e. in particular the value of the fusion confidence index, to the processes using these radar targets, for example an autonomous driving or driver assistance system.

In one embodiment, fusion step E5 comprises a step of comparing each fusion confidence index with a minimum threshold. In this case, fusion step E5 transmits as output, for example to at least one user process, only those digital data associated with the radar targets whose fusion confidence index is higher than the minimum threshold. After being output from this fusion step E5, the confidence index for a radar target detected using a radar has therefore been improved through dual processing, consisting in both taking into account the effects s of the reflection of radar waves by the environment of the radar and taking into account additional data from at least one other sensor. As a result, the confidence index associated with a radar target is thus highly reliable, such that it makes it possible to distinguish false targets from real radar targets. In other words, the "fusion targets" obtained from this fusion step E5 could therefore be filtered according to their confidence index, referred to as the fusion confidence index.

Incidentally, those from among the radar targets coming directly from the radar 1 which cannot be associated with any target from the third step E3 are preferably transmitted to the fusion of the sensors.

In addition, the digital data from this fusion step E5 may also be used in the first step E1 of determining digital data representative of the environment of the radar. Preferably, only those targets whose fusion confidence index is high are transmitted for them to be taken into account in this first, determining step E1.

For this, it is also possible, for example, to set criteria relating to one or more minimum fusion confidence indices relating to said fusion targets processed by this first step. For example, it is possible to impose a first, high minimum fusion confidence index for a fusion target located by a single sensor (for example 0.9), and a second minimum fusion confidence index lower than the first for a fusion target located by at least two sensors (for example 0.5).

One embodiment of the method for guiding or alerting a motor vehicle is further described below with reference to FIG. 1.

The method integrates steps E1 to E5 described above, as well as an additional step of assisting in driving the motor vehicle or of autonomous driving. For this, the method comprises a step E6 of transmitting digital data representative of the targets identified by fusion step E5 to a computer of a vehicle for them to be taken into account in the guiding or alert management of the vehicle. In this guiding or alerting, only those fusion targets whose fusion confidence index is higher than a given threshold are considered.

Step E6 of transmitting the digital data representative of each identified target to a computer of a vehicle may have the end purpose of them being taken into account by a vehicle guidance system or an information or driver alert system, for example for displaying targets on a screen for the driver and/or preventing danger.

The invention also relates to a system for detecting targets using a radar, a system for detecting targets using a radar and at least one other sensor, as well as to a motor vehicle 10 incorporating such a system.

One example of a motor vehicle 10 equipped with a system 7 for detecting targets using a radar is described below with reference to FIG. 1. The motor vehicle 10 is a vehicle of any type, in particular a passenger vehicle, a work vehicle or a self-driving vehicle.

The system 7 for detecting targets using a radar may be part of a more comprehensive system 8 for detecting targets using a radar and at least one other sensor, itself forming part of a guidance or alert device 9 for a motor vehicle 10.

According to the embodiment, the system 7 for detecting targets using a radar primarily comprises:

a radar 1, an onboard database N the electromagnetic properties of all materials liable to be encountered in the road environment, a high-definition map 3 containing the information related to the road environment, a computer 4.

The system advantageously further comprises an electronic memory 49 which constitutes a storage medium that is readable by a computing device or by the computer 4 and comprises instructions which, when they are executed by the computing device or the computer, cause the latter to carry out the method for detecting targets described above.

All of these components are interconnected by communication devices.

The computer 4 makes it possible to execute software comprising the following modules:

a first module 41 which implements step E1 of determining the environment of the vehicle, a second module 42 which implements step E2 of calculating the probabilities of the presence of false targets in the environment of the vehicle, a third module 43 which implements the third step E3 of calculating a reliable confidence index for the radar targets, a fourth module 44 which implements a fourth, filtering step E4, before transmitting the radar targets to a fusion device for the sensors 5.

The more comprehensive system 8 for detecting targets using a radar and at least one other sensor primarily comprises:

at least one system 7 for detecting targets using a radar as described above, at least one other sensor 11, for example a radar or camera sensor, a computer forming a fusion device 5 allowing the execution of software which implements data fusion step E5.

Incidentally, the aforementioned computers 4 and 5 may be separate or form a single computer.

The motor vehicle guidance or alert system 9 primarily comprises:

at least one, more comprehensive system 8 for detecting targets using a radar and at least one other sensor as described above, a driver assistance system 6.

This guidance or alert system may form a driver assistance system or an autonomous guidance system for an autonomous vehicle.

The motor vehicle 10, in particular the system 7 for detecting targets using a radar, preferably comprises all of the hardware and/or software elements configured so as to implement the method defined above.

The invention claimed is:

1. A method for detecting targets using radar, comprising:
generating a map of an environment of the radar in real time;
calculating a probability of a presence of false targets in multiple regions of the environment of the radar based on said map of the environment of the radar;
receiving digital data transmitted by the radar corresponding to at least one radar target, comprising digital data on a location of the at least one radar target; and
calculating a reliable confidence index associated with the at least one radar target based on a probability of the presence of false targets in a region where the at least one radar target is located, wherein the digital data transmitted by the radar corresponding to the at least one radar target comprise an initial confidence index, and the calculating the reliable confidence index associated with the at least one radar target is based on the initial confidence index and a complement of the probability of the presence of false targets in the region where the at least one radar target is located.

2. The method as claimed in claim 1, wherein the generating the map of the environment of the radar uses digital data from a high-definition map.

3. The method as claimed in claim 1, wherein the generating the map of the environment of the radar uses digital data from a high-definition map and data from said radar.

4. The method as claimed in claim 1, wherein the generating the map of the environment of the radar uses digital data from a high-definition map, data from said radar, and data from one or more other sensors.

5. The method as claimed in claim 1, wherein the calculating the probability of the presence of false targets is based on equations for propagation of electromagnetic waves in the environment of the radar, which are dependent on said map of the environment of the radar.

6. The method as claimed in claim 1, wherein the calculating the reliable confidence index associated with the at least one radar target further comprises:
when the probability of the presence of false targets in the region where the at least one radar target is located is lower than a given threshold, the reliable confidence index is equal to the initial confidence index, and
when the probability of the presence of false targets in the region where the at least one radar target is located is higher than or equal to said given threshold, a new reliable confidence index is strictly lower than the initial confidence index.

7. The method as claimed in claim 1, further comprising: aggregating, via a fusion step, the digital data transmitted by the radar corresponding to at least one radar target and digital data transmitted by at least one other sensor to output digital data corresponding to at least one target, said digital data comprising a location of the at least one target and a fusion confidence index for the at least one target.

8. The method as claimed in claim 7, further comprising: when a target from the fusion step has a fusion confidence index higher than a predetermined threshold, then the digital data associated with the at least one target are transmitted for them to be taken into account in the generating the map of the environment of the radar.

9. The method as claimed in claim 1, further comprising: transmitting the digital data transmitted by the radar corresponding to at least one radar target to a computer of a vehicle for the digital data to be taken into account.

10. The method as claimed in claim 7, further comprising: transmitting the digital data transmitted by the radar corresponding to at least one radar target to a computer of a vehicle for the digital data to be taken into account.

11. A system for detecting targets using radar comprising: circuitry; and
at least one radar connected by a communication device to the circuitry, wherein
the circuitry is configured to
generate a map of an environment of the radar in real time,
calculate a probability of a presence of false targets in multiple regions of the environment of the radar based on said map of the environment of the radar,
receive digital data transmitted by the radar corresponding to at least one radar target, comprising digital data on a location of the at least one radar target, and
calculate a reliable confidence index associated with the at least one radar target based on a probability of the presence of false targets in a region where the at least one radar target is located,
the digital data transmitted by the radar corresponding to the at least one radar target comprise an initial confidence index, and
the circuitry is configured to calculate the reliable confidence index associated with the at least one radar target is based on the initial confidence index and a complement of the probability of the presence of false targets in the region where the at least one radar target is located.

12. A system for detecting targets using radar and at least one sensor, comprising:
circuitry;
at least one radar connected by a communication device to the circuitry; and
at least one other sensor
wherein
the circuitry is configured to
generate a map of an environment of the radar in real time,
calculate a probability of a presence of false targets in multiple regions of the environment of the radar based on said map of the environment of the radar,
receive digital data transmitted by the radar corresponding to at least one radar target, comprising digital data on a location of the at least one radar target, and
calculate a reliable confidence index associated with the at least one radar target based on a probability of the presence of false targets in a region where the at least one radar target is located,
the digital data transmitted by the radar corresponding to the at least one radar target comprise an initial confidence index, and
the circuitry is configured to calculate the reliable confidence index associated with the at least one radar target is based on the initial confidence index and a complement of the probability of the presence of false targets in the region where the at least one radar target is located.

13. A motor vehicle, comprising:
a driver assistance system, and
the system for detecting targets using radar and at least one sensor as claimed in claim 12.

* * * * *